United States Patent [19]

Adachi et al.

[11] Patent Number: 5,199,010
[45] Date of Patent: Mar. 30, 1993

[54] METHOD FOR INITIALIZING A MAGNETO-OPTICAL DISK USING A COIL AS A MEANS TO INITIALIZE THE DISK

[75] Inventors: Nobuyuki Adachi; Naoshi Sugiyama, both of Kanagawa, Japan

[73] Assignee: Fuji Photo Film Co., Ltd., Kanagawa, Japan

[21] Appl. No.: 433,233

[22] Filed: Nov. 8, 1989

[30] Foreign Application Priority Data

Nov. 11, 1988 [JP] Japan .................. 63-284986

[51] Int. Cl.$^5$ .................. G11B 13/04; G11B 11/12; G11B 11/10
[52] U.S. Cl. .................. 369/13; 360/59; 360/114
[58] Field of Search .................. 369/13; 360/59, 114; 365/10, 27, 28, 122; 336/77, 84 M, 177; 428/694, 900

[56] References Cited

U.S. PATENT DOCUMENTS 3,486,449 12/1969 Levine .................. 336/177 X
3,879,754  4/1975 Balinger .................. 360/66 X
4,914,532  4/1990 Ohashi et al. .................. 360/66

FOREIGN PATENT DOCUMENTS 58-91522 5/1983 Japan .
61-11950 1/1986 Japan .................. 369/13
61-71436 4/1986 Japan .................. 369/13
63-213138 9/1988 Japan .

OTHER PUBLICATIONS

Fusao Fujimori, *Yasashii Chotanpa No Oyo* (Simple Application of Ultrasonic Wave), new ed., (Tokyo: Sanyo Shuppan, Jan. 25, 1982), pp. 91-93 and 221.

Primary Examiner—Hoa T. Nguyen
Attorney, Agent, or Firm—Sughrue, Mion, Zinn, Macpeak & Seas

[57] ABSTRACT

A method for initializing a magneto-optial disk comprises the steps of positioning at least one magneto-optical disk in a coil, wherein the length of said coil is shorter than the diameter thereof, so that the direction of the thickness of the magneto-optical disk coincides with the axial direction of the coil, and applying a predetermined pulsed current to the coil in order to generate an instantaneous magnetic field. The pulsed current is generated by a device comprising a charging circuit which charges a capacitor, and a discharging circuit, which applies a current to the coil, said current being generated by discharging the capacitor. A lifter supports the magneto-optical disk and conveys the magneto-optical disk in the direction of the thickness thereof in order to position it in the coil.

5 Claims, 1 Drawing Sheet

METHOD FOR INITIALIZING A MAGNETO-OPTICAL DISK USING A COIL AS A MEANS TO INITIALIZE THE DISK

BACKGROUND OF THE INVENTION

1. Field of the Invention

This invention relates to a method for initializing a magneto-optical disk. This invention particularly relates to a method for initializing a magneto-optical disk wherein all parts of a magnetic layer constituting a recording layer become magnetized in the vertical direction.

2. Description of the Prior Art

Magneto-optical disks enable information to be recorded at a high density with a laser beam. When information is recorded on a magneto-optical disk, a laser beam is irradiated to the recording layer of the magneto-optical disk while a magnetic field is applied in a predetermined direction thereto, which results in the recording layer being locally magnetized in a desirable direction.

In general, the recording layer is formed on a substrate, which may be constituted of a polycarbonate or the like, and a layer of an amorphous alloy of a rare earth metal and a transition metal, which layer is overlaid on the substrate with a layer forming technique, such as sputtering. The recording layer is formed so that its easily magnetizable axis (C axis) is vertical with respect to the surface of the substrate. However, all parts of the recording layer are not originally magnetized vertically; rather, they are magnetized in random directions. Therefore, before the magneto-optical disk is used to record information, it must be initialized so that all parts of the recording layer will be magnetized in the vertical direction.

When a magneto-optical disk is initialized, it is located in a magnetic field having an intensity higher than the coercive force (Hc) of the magnetic layer, which constitutes the recording layer. However, because the coercive force of the magnetic layer is generally as high as several killooersteds, and sometimes even higher than 10 kOe, it is not easy to initialize a magneto-optical disk with ordinary methods, when a static magnetic field is applied to the magneto-optical disk. Therefore, a method has been proposed wherein a laser beam is irradiated to a magneto-optical disk, which is rotating, in order to heat the recording layer of the magneto-optical disk to the Curie temperature and thereby decrease the coercive force of the recording layer, after which a weak static magnetic field is applied to the magneto-optical disk in order to cause all parts of the recording layer to be magnetized in a single direction. The proposed method accurately initializes a magneto-optical disk with a weak static magnetic field. However, the proposed method is not suitable for mass-production of magneto-optical disks because the laser beam must be irradiated to the magneto-optical disk over its whole track length, and therefore as much as 10 minutes of processing time is required for each magneto-optical disk even when the magneto-optical disk is rotated at a speed of 1,800 rpm with a disk drive unit.

In order to cope with the aforesaid problems, a technique wherein a radio-frequency induction heating process is utilized has been disclosed in, for example, Japanese Unexamined Patent Publication No. 63(1988)-213138. With the disclosed technique, a plurality of stacked magneto-optical disks are subjected to a radio-frequency induction heating process in order to heat only the recording layers, which are constituted of electrically conductive materials, to a temperature near the Curie temperature, thereby decreasing the coercive force (Hc) of the recording layers. While the magneto-optical disks are in this condition, a predetermined static magnetic field is applied to them, after which they are cooled to normal temperatures. In this way all parts of the recording layers are magnetized in a single direction.

However, a recording layer is very thin (approximately 1,000 A). Therefore, with the aforesaid technique wherein a radio-frequency induction heating process is utilized, a substantially large amount of Joule heat cannot uniformly be generated over the whole area of each recording layer, and initialization cannot be achieved accurately. Also, heat from the recording layer is transferred to the substrate and layers other than the recording layer, which causes these layers of the magneto-optical disk to deform and change their optical characteristics. Moreover, the required equipment is expensive because of the radio-frequency power source and the like.

SUMMARY OF THE INVENTION

The primary object of the present invention is to provide a method for initializing magneto-optical disks, wherein magneto-optical disks are accurately initialized over the whole area of the recording layers thereof, and which is suitable for use during the mass-production of the magneto-optical disks.

Another object of the present invention is to provide a method for initializing magneto-optical disks, wherein the substrate and layers thereof do not deform or change their optical characteristics, and which is carried out with inexpensive equipment.

The present invention provides a first method for initializing a magneto-optical disk, which comprises the steps of:

i) positioning at least one magneto-optical disk in a coil, wherein the coil length is shorter than the coil diameter, so that the thickness direction of said magneto-optical disk coincides with the axial direction of said coil, and ii) applying a predetermined pulsed current across said coil in order to generate an instantaneous magnetic field.

The present invention also provides a second method for initializing a magneto-optical disk, wherein a means for generating said pulsed current comprises a charging circuit which charges a capacitor, and a discharging circuit which applies a current, which is generated by discharging said capacitor, to said coil.

The present invention further provides a third method for initializing a magneto-optical disk, wherein a means for positioning said magneto-optical disk in said coil is a lifter which supports said magneto-optical disk and conveys it in the direction of the thickness thereof.

With the first method for initializing a magneto-optical disk in accordance with the present invention, the pulsed current is applied to the coil in order to generate an instantaneous magnetic field having a high intensity. Therefore, it is not necessary to increase the temperature of the recording layer of the magneto-optical disk to a value near the Curie temperature in order to decrease the coercive force of the recording layer. Because the recording layer need not be heated, a radio-frequency induction heating process, or the like, need not be used. Therefore, the accuracy with which the magneto-optical disk is initialized does not deteriorate due to uneven heating, and the substrate and layers of the magneto-optical disk do not deform when they are heated. Also, no radio-frequency power source need be provided, and therefore the cost of the equipment can be kept low. Furthermore, because the whole area of the recording layer can be initialized with a single application of the pulsed current to the coil, the time required to initialize a magneto-optical disk can be kept short, and productivity can be kept high.

With the second method for initializing a magneto-optical disk in accordance with the present invention, the pulsed current is generated by charging and discharging circuits in which a capacitor is charged and is thereafter discharged. The charging and discharging circuits are simple in configuration and cheap, and therefore the cost of the equipment can be kept low.

With the third method for initializing a magneto-optical disk in accordance with the present invention, the lifter is used to convey the magneto-optical disk into the coil. It is very easy to convey the magneto-optical disk into the coil with the lifter. Also, in cases where a plurality of magneto-optical disks are placed on the lifter and the lifter is moved continuously or intermittently, a plurality of magneto-optical disks can be sequentially initialized. Therefore, productivity can be kept high.

As described above, with the methods for initializing magneto-optical disks in accordance with the present invention, because an instantaneous magnetic field having a high intensity is utilized, the magneto-optical disks need not be heated. Also, the shape of the coil causes the instantaneous magnetic field to be generated efficiently. Therefore, the whole area of the recording layer of the magneto-optical disk can be initialized accurately, and no problem arises with regard to deformation of the substrate and layers of the magneto-optical disk, a change in optical characteristics and the like. Also, neither a radio-frequency power source nor a cooling circuit, which were necessary with the conventional technique, need be provided, and therefore the cost of the equipment can be kept low. Furthermore, a plurality of magneto-optical disks can be initialized simultaneously and instantaneously, and therefore the magneto-optical disks can be mass-produced very efficiently.

DESCRIPTION OF THE PREFERRED EMBODIMENTS

The present invention will hereinbelow be described in further detail with reference to the accompanying drawings.

Figure 1:
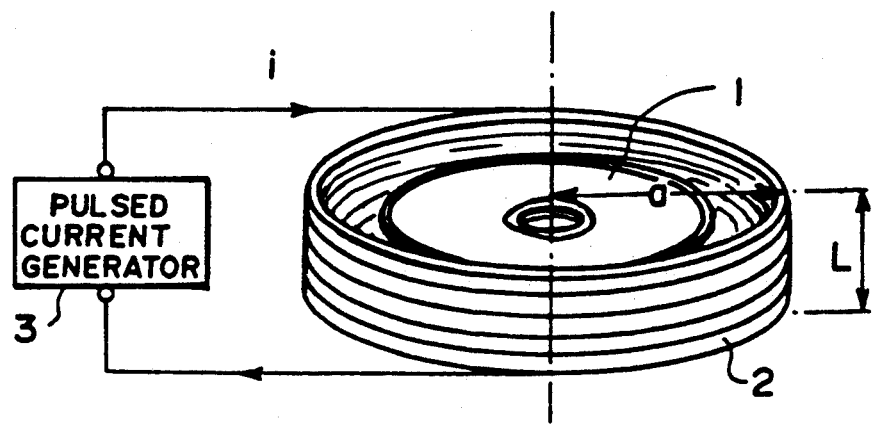
FIG. 1 is a schematic view showing an apparatus for carrying out an embodiment of the method for initializing a magneto-optical disk in accordance with the present invention.

With reference to FIG. 1, an apparatus for carrying out an embodiment of the method for initializing a magneto-optical disk in accordance with the present invention comprises an air-core coil 2, in which a magneto-optical disk 1 can be positioned, and a pulsed current generating circuit 3 which applies a pulsed current across the air-core coil 2. After the magneto-optical disk 1 is positioned in the air-core coil 2, a pulsed current is generated by the pulsed current generating circuit 3 and applied to the air-core coil 2. As a result, an instantaneous magnetic field is generated in the air-core coil 2. The instantaneous magnetic field causes all parts of a recording layer of the magneto-optical disk 1 to be magnetized in a single direction, which is the vertical direction with respect to a substrate of the magneto-optical disk 1. The air-core coil 2 is annular and has a size which enables the magneto-optical disk 1 to be positioned therein such that the direction of the thickness of the magneto-optical disk 1 coincides with the axial direction of the air-core coil 2. For example, in cases where the diameter of the magneto-optical disk 1 is 130 mm, the inner diameter $2a$ (a being the radius of the disk 1) of the air-core coil 2 is set at 140 mm. Also, the coil length L is shorter than the inner diameter $2a$ so that the instantaneous magnetic field is generated with a high efficiency. By way of example, the coil length L is 90 mm. The number of turns of the air-core coil 2 does not affect the intensity of the instantaneous magnetic field, and therefore it may be set to any appropriate value.

Figure 2:
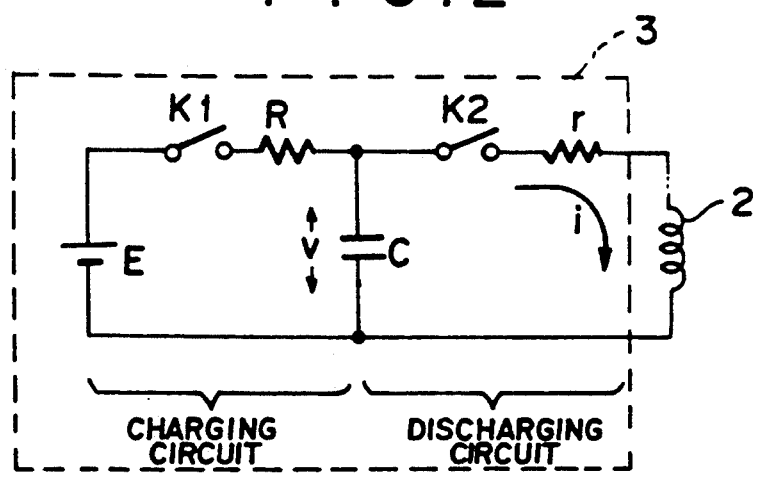
FIG. 2 is a circuit diagram showing the pulsed current generating circuit of the apparatus shown in FIG. 1.

FIG. 2 shows the configuration of the pulsed current generating circuit 3. The pulsed current generating circuit 3 comprises a charging circuit, which is constituted of a power source E, a charging switch K1, a resistor R, and a capacitor C, and a discharging circuit, which is constituted of the capacitor C, a discharging switch K2, and a resistor r. The charging switch K1 is switched on at a predetermined time in order to charge the capacitor C. Thereafter, when the magneto-optical disk 1 is located at a predetermined position in the vicinity of the middle of the coil length L in the air-core coil 2, the charging switch K1 is switched off, and the discharging switch K2 is switched on in order to discharge the electric charge which has accumulated in the capacitor C. The pulsed current, which is generated when the capacitor discharges, is applied to the air-core coil 2. As a result, an instantaneous magnetic field is generated in the air-core coil 2. By way of example, the voltage of the power source E is 2,000 V, and the capacitance of the capacitor C is 2,000 μF. Under these conditions, the pulse width of the pulsed current falls within the range of, for example, 5 to 6 msec.

Calculations will be made hereinbelow in order to find the shape of the air-core coil 2, which results in the most efficient generation of the instantaneous magnetic field.

The inner diameter of the air-core coil 2 is denoted by $2a$, the coil length is denoted by L (=2l), and the number of turns of the air-core coil 2 is denoted by n. The value of the pulsed current which is applied across the air-core coil 2 is denoted by i.

When the pulsed current is applied to the air-core coil 2, the intensity of the instantaneous magnetic field H at the middle part of the coil length L of the air-core coil 2 is $$H = \frac{ni}{2\sqrt{a^2 + l^2}} \qquad 1)$$

The inductance I of the air-core coil 2 can be calculated from the formula $$I = K \cdot \frac{2\pi^2 n^2 a^2}{l} \times 10^{-7} \quad 2)$$

where K denotes the Nagaoka's coefficient. The Nagaoka's coefficient K is expressed approximately as $$K = \left(1 + 0.45\frac{a}{l}\right)^{-1} \quad 3)$$

In order to calculate the change in the current i(t), which is obtained when the air-core coil 2 having an inductance I is connected to the pulsed current generating circuit 3 as shown in FIG. 2, the simultaneous differential equations expressed as $$\left. \begin{array}{l} L\frac{di}{dt} + ri + v = 0 \\ i = C\frac{dv}{dt} \end{array} \right\} \quad 4)$$

where v denotes the voltage across the terminals of the capacitor C and r denotes the internal resistance of the air core coil 2, are solved.

The solution of the simultaneous equations results in $$\left. \begin{array}{l} i(t) = CE\frac{\omega_n}{\sqrt{1-\xi^2}} e^{-\xi\omega_n t} \cdot \sin(\sqrt{1-\xi^2}\, \omega_n t) \\ \omega_n = \sqrt{\frac{1}{Lc}}, \xi = \frac{r}{2}\sqrt{\frac{c}{L}} \end{array} \right\} \quad 5)$$

The internal resistance r of the air-core coil 2 can be regarded as approximately equal to zero. When r=0, the maximum value of the current i(t) becomes $$\max\{i(t)\} = E\sqrt{\frac{c}{L}} \quad 6)$$

From Formulas (1), (2), (3), and (6), the maximum intensity of the instantaneous magnetic field can be expressed as $$\max\{H(t)\} = \frac{E}{2\pi} \sqrt{\frac{C(l + 0.45a)}{2a^2(a^2 + l^2)} \times 10^7} \quad 7)$$

As is clear from Formula (7), the maximum intensity of magnetic field is not related to the number of turns n of the air-core coil 2, but is determined by the voltage of the power source E of the charging circuit, the capacitance of the capacitor C, and the shape of the air-core coil 2.

The part of Formula (7) related to the shape g of the air-core coil 2 is $$g = \frac{l + 0.45a}{a^2(a^2 + l^2)} \quad 8)$$

When g is at a maximum, the intensity of instantaneous magnetic field max{H(t)} is also maximum.

Differentiating both sides of Formula (8) with respect to l and setting the value equal to zero yield $$l \approx 0.65a \quad 9)$$

Formula (9) indicates that the efficiency with which the instantaneous magnetic field is generated is best when the coil length 2l is approximately 0.65 times as long as the coil diameter 2a.

Also, from Formulas (7) and (9), the maximum intensity of instantaneous magnetic field Hmax in the aforesaid case becomes $$H_{max} = 313\, E \cdot \sqrt{\frac{c}{a^3}} \quad 10)$$

Accordingly, when values from the aforesaid embodiment are substituted into Formulas (8) and (10), the coil length 2l, the coil diameter 2a of the air-core coil 2, and the maximum intensity of the instantaneous magnetic field Hmax can be calculated as described below. Specifically, in cases where a magneto-optical disk 1 having a diameter of 130 mm, whose recording layer has a coercive force within the range of 13 to 15 kOe, is initialized, it is necessary for the air-core coil 2 to have a coil diameter 2a larger than the diameter of the magneto-optical disk 1. Also, the maximum intensity of the instantaneous magnetic field Hmax must be set at least equal to approximately 15 kOe. The coil diameter 2a of the air-core coil 2 is set at 140 mm, the voltage of the power source E of the charging circuit is set at 2,000 V, and the capacitance of the capacitor C is set at 2,000 μF. In such cases, from Formula (9), the coil length 2l should be approximately 90 mm. Also, as can be calculated from Formula (10), the maximum intensity of the instantaneous magnetic field Hmax equals $1.5 \times 10^6$ (A/m) = 19 kOe. In the calculations described above, the internal resistance r of the air-core coil 2 shown in FIG. 2 is set approximately equal to zero. In such cases, the current i(t) represented by Formulas (5) should exhibit an undamped oscillatory waveform. Actually, however, the internal resistance r has a very small, fixed value. Therefore, part of the electric field energy from the capacitor C is lost in the form of Joule heat, and the current i(t) exhibits a damped oscillatory waveform. Accordingly, the maximum intensity of the instantaneous magnetic field actually obtained is slightly lower than 19 kOe. In experiments carried out by the inventors, the maximum intensity of the instantaneous magnetic field actually obtained was 15 kOe. This maximum value in the intensity of instantaneous magnetic field is adequate for initializing the magneto-optical disk 1 described above.

The intensity of the magnetic field generated by the air-core coil 2 varies along the length of the air-core coil 2, and is largest near the middle thereof. Particularly, in cases where the length of the air-core coil 2 is set to a small value as described above in order to achieve a high efficiency in the generation of the instantaneous magnetic field, the region in which the intensity of the magnetic field is adequate for initializing the magneto-optical disk 1 is limited to a narrow region in the vicinity of the middle of the air-core coil 2. Therefore, when the magneto-optical disk 1 is initialized, it should be located near the middle of the air-core coil 2. By way of example, the region, in which the intensity of the magnetic field is adequate for initializing the magneto-optical disk 1, extends approximately 10 mm from the middle of the air-core coil 2 in the direction of the length thereof. Therefore, for example, several magneto-optical disks 1, 1, . . . can be initialized simultaneously.

Figure 3:
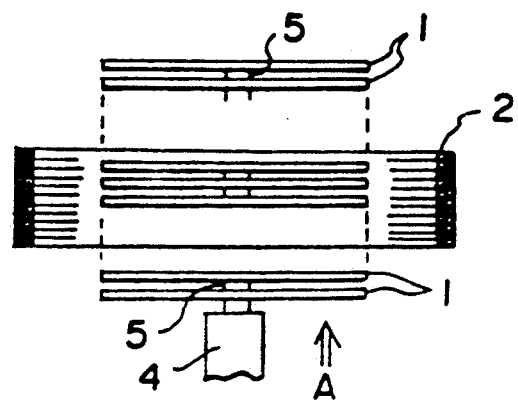
FIG. 3 is a schematic view showing an apparatus wherein a lifter is used to convey magneto-optical disks into a coil.

As shown in FIG. 3, in order to achieve a high efficiency in the initialization of a plurality of magneto-optical disks 1, 1, . . . , a lifter 4 which moves vertically with respect to the air-core coil 2 should be used. Specifically, a plurality of magneto-optical disks 1, 1, . . . are stacked via spacers 5, 5, . . . on the lifter 4. A shaft of the lifter 4 moves in the direction indicated by the arrow A until several magneto-optical disks 1, 1, . . . at the top part of the stack are located at a position near the middle of the air-core coil 2. Once the lifter 4 has positioned these magneto-optical disks near the middle of the air-core coil 2, it stops moving, and the pulsed current is generated by the pulsed current generating circuit 3 and applied to the air-core coil 2 in order to initialize the several magneto-optical disks 1, 1, . . . at the top part of the stack. Thereafter, the lifter 4 moves in the direction indicated by the arrow A until several more magneto-optical disks 1, 1, . . . which are located just below the top part of the stack are positioned near the middle of the air-core coil 2. Then the lifter 4 stops moving, and the pulsed current is generated by the pulsed current generating circuit 3 and applied to the air-core coil 2 in order to initialize these magneto-optical disks 1, 1, . . . . Thereafter, the operations described above are repeated in order to initialize all of the magneto-optical disks 1, 1, . . . stacked on the lifter 4. In order to obtain a long charging time and keep the operating efficiency of the initializing apparatus high, the pulsed current generating circuit should preferably be provided with a plurality of capacitors C, C, . . . that are sequentially discharged. The charging of a capacitor C can then begin immediately after its discharge.

When a circuit for generating an instantaneous magnetic field as described above is used in order to initialize a magneto-optical disk 1, the time required to discharge a capacitor (e.g. 5 to 6 msec) is much shorter than the time required to charge the same (e.g. 10 sec), and therefore little heat is generated in the air-core coil 2. Also, it is not necessary to provide a coil cooling circuit. Such circuits are difficult to make and are expensive. Moreover, with the method for initializing a magneto-optical disk in accordance with the present invention, elements located in the magnetic field are not heated. Therefore, for example, the magneto-optical disks 1, 1, . . . can be accommodated in protective cases, which are constituted of a plastic material or the like, and stacked on the lifter 4. The magneto-optical disks 1, 1, . . . accommodated in protective cases can then be inserted into the air-core coil 2. In this manner, it is possible to eliminate problems with dust clinging to the magneto-optical disks 1, 1, . . . and their becoming scratched during the initialization process.

The apparatus for carrying out the method for initializing a magneto-optical disk in accordance with the present invention is not limited to that described above. For example, the configuration of the pulsed current generating circuit may be modified in various other manners. Also, in the aforesaid embodiment, the lifter 4 makes incremental steps when moving the magneto-optical disks 1, 1, . . . stacked thereon. Alternatively, the lifter 4 may move continuously. Specifically, it is only necessary that the magneto-optical disks 1, 1, . . . stacked on the lifter 4 be subjected at least once to the instantaneous magnetic field present near the middle of the air-core coil 2 in the direction of the length thereof.

I claim:

1. A method for initializing a magneto-optical disk, which comprises the steps of:
    i) positioning at least one magneto-optical disk in a coil, wherein the coil length is shorter than the coil diameter, so that the direction of the thickness of said magneto-optical disk coincides with the axial direction of said coil, and
    ii) applying a predetermined pulse current across said coil in order to generate a pulsed magnetic field having an instantaneous magnetic field.

2. A method as defined in claim 1, wherein said step of applying said predetermined pulsed current is performed by a means for generating said predetermined pulsed current comprising a charging circuit which charges a capacitor, and a discharging circuit which applies a current generated by the discharging of said capacitor to said coil.

3. A method as defined in claim 1, wherein said step of positioning said magneto-optical disk is performed by a lifter which supports said magneto-optical disk and conveys said disk in the direction of the thickness thereof.

4. A method as defined in claim 1, wherein said coil length is approximately 0.65 times as long as said coil diameter.

5. A method as defined in claim 1 wherein said magneto-optical disk is positioned near the middle of said coil in the direction of the length thereof.

* * * * *